US010357825B2

(12) United States Patent
Tagami et al.

(10) Patent No.: US 10,357,825 B2
(45) Date of Patent: Jul. 23, 2019

(54) SURFACE-COATED COPPER FILLER, METHOD FOR PRODUCING SAME AND CONDUCTIVE COMPOSITION

(71) Applicant: NOF CORPORATION, Shibuya-ku, Tokyo (JP)

(72) Inventors: Yasunobu Tagami, Tsukuba (JP); Naoshi Takahashi, Tsukuba (JP); Masayuki Saitoh, Tsukuba (JP); Kouhei Sawada, Tsukuba (JP)

(73) Assignee: NOF CORPORATION, Tokyo (JP)

( * ) Notice: Subject to any disclaimer, the term of this patent is extended or adjusted under 35 U.S.C. 154(b) by 0 days.

(21) Appl. No.: 15/735,255

(22) PCT Filed: Jun. 8, 2016

(86) PCT No.: PCT/JP2016/067057
§ 371 (c)(1),
(2) Date: Dec. 11, 2017

(87) PCT Pub. No.: WO2016/199811
PCT Pub. Date: Dec. 15, 2016

(65) Prior Publication Data
US 2018/0169755 A1 Jun. 21, 2018

(30) Foreign Application Priority Data
Jun. 12, 2015 (JP) ................................ 2015-119492

(51) Int. Cl.
*B32B 5/16* (2006.01)
*B22F 1/00* (2006.01)
(Continued)

(52) U.S. Cl.
CPC .............. *B22F 1/0062* (2013.01); *B22F 1/00* (2013.01); *B22F 1/02* (2013.01); *H01B 1/02* (2013.01);
(Continued)

(58) Field of Classification Search
CPC ........ B22F 1/0062; B22F 1/0088; C09D 5/24; C23C 24/00; C23C 26/00; C23C 28/00
(Continued)

(56) References Cited

U.S. PATENT DOCUMENTS 4,705,647 A * 11/1987 Yamaguchi .......... C08K 5/3472 174/102 SC
2007/0051927 A1* 3/2007 Itoh ...................... B22F 1/0003 252/500
(Continued)

FOREIGN PATENT DOCUMENTS

JP H02-218762 A 8/1990
JP H03-077202 A 4/1991
JP 2004-225122 A 8/2004

OTHER PUBLICATIONS

International Search Report received for PCT Patent Application No. PCT/JP2016/067057 dated Sep. 6, 2016, 2 pages (1 page of English translation of International Search Report, and 1 page of International Search Report).

*Primary Examiner* — Hoa (Holly) Le

(57) ABSTRACT

There are provided a surface-coated copper filler having an excellent oxidation resistance for use in a conductive composition, a method for producing the surface-coated copper filler, and a conductive composition containing the surface-coated copper filler. The surface-coated copper filler comprises: a copper particle; a first coating layer containing an amine compound, which is bonded to copper on a surface of the copper particle via a chemical bond and/or a physical bond; and a second coating layer containing an aliphatic monocarboxylic acid having 8 to 20 carbon atoms, which is bonded to the amine compound via a chemical bond. The amine compound is represented by the following formula (1):

$$H_2N{-}[{-}(CH_2)_m{-}NH{-}]_n{-}(CH_2)_m{-}NH_2 \quad (1)$$

(Continued)

wherein m is an integer of 0 to 3, n is an integer of 0 to 2, m is 0 to 3 when n is 0, and m is 1 to 3 when n is 1 or 2.

6 Claims, 3 Drawing Sheets

(51) Int. Cl.
*B22F 1/02* (2006.01)
*H01B 1/02* (2006.01)
*H01B 1/22* (2006.01)
*H01B 5/00* (2006.01)
*H01B 13/00* (2006.01)

(52) U.S. Cl.
CPC ............... *H01B 1/026* (2013.01); *H01B 1/22* (2013.01); *H01B 5/00* (2013.01); *H01B 13/00* (2013.01); *B22F 2301/10* (2013.01)

(58) Field of Classification Search
USPC .................. 428/403; 427/212, 216, 220, 402
See application file for complete search history.

(56) References Cited

U.S. PATENT DOCUMENTS

| | | | | |
|---|---|---|---|---|
| 2009/0214764 | A1* | 8/2009 | Li | B22F 1/0018 427/98.4 |
| 2011/0059233 | A1* | 3/2011 | Liu | B22F 1/0018 427/123 |
| 2013/0334470 | A1* | 12/2013 | Kurihara | B22F 1/02 252/514 |

* cited by examiner

SURFACE-COATED COPPER FILLER, METHOD FOR PRODUCING SAME AND CONDUCTIVE COMPOSITION

CROSS REFERENCE TO RELATED APPLICATIONS

This patent application is a U.S. national stage application under 35 U.S.C. § 371 of International Patent Application No. PCT/JP2016/067057 filed on Jun. 8, 2016, which claims the benefit of foreign priority to Japanese Patent Application No. JP 2015-119492 filed on Jun. 12, 2015. The International Application was published in Japanese on Dec. 15, 2016, as International Publication No. WO 2016/199811 A1 under PCT Article 21(2).

FIELD OF ART

The present invention relates to a surface-coated copper filler for a conductive composition, a method for producing the surface-coated copper filler, and a conductive composition containing the surface-coated copper filler.

BACKGROUND ART

A conductive composition containing a conductive metal as a main component has been widely used for achieving an electrical conduction in the field of electronic materials and the like. For example, the conductive composition may be used for forming a circuit of a printed wiring board, a lead-out wiring of a touch panel, an electrical junction, etc. This conductive composition is a fluid formulation, and typical examples thereof include silver pastes. The conductive composition is applied in a pattern by screen printing, ink-jet printing (hereinafter referred to as IJ printing), or the like, and the applied composition is hardened by applying a light or heat to form a conductive hardened product. The conductive composition contains a conductive metal filler, and silver is often used in the filler because it has an excellent oxidation resistance and a low specific volume resistance. However, the silver is costly, and often causes migration, disadvantageously. Therefore, use of copper in the conductive composition has been studied in recent years, because the copper has a low specific volume resistance (low next to the silver), is inexpensive, and has an excellent migration resistance.

As a copper filler for the conductive composition, Patent Publication 1 discloses a copper particle coated with an aliphatic monocarboxylic acid for improving the oxidation resistance and dispersibility. Furthermore, Patent Publication 1 describes that when the copper particle is coated with the aliphatic monocarboxylic acid by a wet method, and is then dried and pulverized by using a wind circulator, the resultant coated copper particle can exhibit a high dispersibility and an excellent effect of controlling the viscosity of the conductive composition.

CITATION LIST

Patent Publication 1: JP 2004-225122 A

SUMMARY OF THE INVENTION

Problems to be Solved by the Invention

However, copper is susceptible to oxidation. Therefore, the oxidation resistance of the copper particle cannot be sufficiently improved only by coating the copper particle with the aliphatic monocarboxylic acid, and the resultant coated copper particle can be readily oxidized in an atmospheric air. In a case where such copper particles with oxidized surfaces are used as the filler in the conductive composition, the conductivity between the particles is lowered because of high volume resistivity of the surface copper oxide, and the hardened product of the conductive composition exhibits a high volume resistivity disadvantageously.

Accordingly, an object of the present invention is to provide a surface-coated copper filler, which has an excellent oxidation resistance and is suitable for use in a conductive composition, and a method for producing the surface-coated copper filler.

Another object of the present invention is to provide a conductive composition, which contains the surface-coated copper filler and is capable of forming a hardened product having a high conductivity.

Means for Solving the Problem

As a result of intense research in view of above objects, the inventors have found that a coated copper particle with an excellent oxidation resistance can be produced by using a particular coating agent and a particular method. The present invention has been accomplished based on this finding.

According to an aspect of the present invention, there is provided a surface-coated copper filler for a conductive composition, comprising: a copper particle; a first coating layer containing an amine compound, which is bonded to copper on a surface of the copper particle via a chemical bond and/or a physical bond; and a second coating layer containing an aliphatic monocarboxylic acid having 8 to 20 carbon atoms, which is bonded to the amine compound via a chemical bond. The amine compound is represented by the following formula (1):

$$H_2N{-}[{-}(CH_2)_m{-}NH{-}]_n{-}(CH_2)_m{-}NH_2 \qquad (1)$$

wherein m is an integer of 0 to 3, n is an integer of 0 to 2, m is 0 to 3 when n is 0, and m is 1 to 3 when n is 1 or 2.

According to another aspect of the present invention, there is provided a method for producing a surface-coated copper filler for a conductive composition, comprising the steps of: (A) mixing a copper particle with an amine compound solution containing an amine compound of the above formula (1) to prepare a mixture a, thereby forming a first coating layer containing the amine compound on a surface of the copper particle; (B) removing, from the mixture a, the residual amine compound solution containing the remaining free amine compound, not used in the first coating layer, to prepare an intermediate 1 containing the copper particle having the first coating layer; (C) mixing the intermediate 1 with an aliphatic monocarboxylic acid solution containing an aliphatic monocarboxylic acid having 8 to 20 carbon atoms to prepare a mixture b, thereby forming a second coating layer containing the aliphatic monocarboxylic acid on the first coating layer; (D) removing, from the mixture b, the residual aliphatic monocarboxylic acid solution containing the remaining free aliphatic monocarboxylic acid, not used in the second coating layer, to prepare an intermediate 2 containing the copper particle having the first and second coating layers; and (E) drying the intermediate 2.

According to a further aspect of the present invention, there is provided a conductive composition comprising the surface-coated copper filler of the present invention.

Effect of the Invention

The surface-coated copper filler of the present invention for the conductive composition has the first coating layer containing the particular amine compound and the second coating layer containing the particular aliphatic monocarboxylic acid. Therefore, the surface of the copper particle is not susceptible to oxidation, and has an extremely excellent oxidation resistance.

The method of the present invention is capable of producing the surface-coated copper filler having the particular first and second coating layers for achieving the excellent oxidation resistance.

The conductive composition of the present invention contains the surface-coated copper filler of the present invention, and therefore has the excellent oxidation resistance and is capable of forming a hardened product with a low volume resistivity and a high conductivity.

EMBODIMENTS OF THE INVENTION

Figure 1:
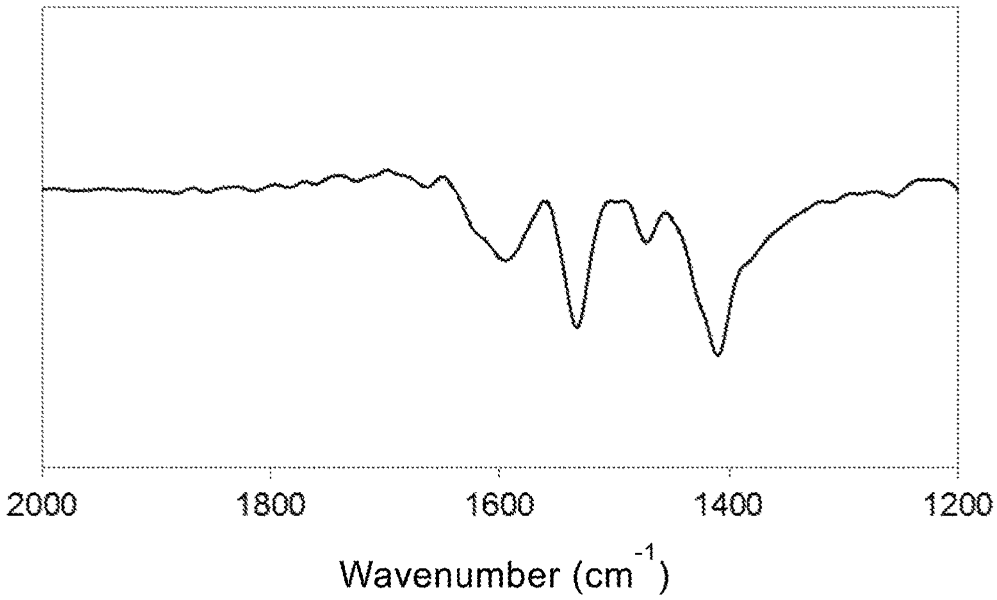
FIG. 1 is a diagram showing an IR spectrum of a surface of a surface-coated copper filler according to Example 1-1.

An embodiment of the present invention will be described in detail below.

<Surface-Coated Copper Filler>

The surface-coated copper filler of the present invention will be described below. The surface-coated copper filler of the present invention is a particulate copper filler for a conductive composition. The surface-coated copper filler contains a copper particle, a first coating layer, and a second coating layer. The first coating layer contains an amine compound of the following formula (1), and the amine compound is bonded to copper on a surface of the copper particle via a chemical bond and/or a physical bond. The second coating layer is formed on the first coating layer and contains an aliphatic monocarboxylic acid having 8 to 20 carbon atoms, and the aliphatic monocarboxylic acid is bonded to the amine compound via a chemical bond.

$$H_2N\{(CH_2)_mNH\}_n(CH_2)_mNH_2 \quad (1)$$

In the formula (1), m is an integer of 0 to 3, and n is an integer of 0 to 2. When n is 0, m is an integer of 0 to 3. When n is 1 or 2, m is an integer of 1 to 3.

The copper particle used in the present invention may be a known common copper particle for a copper paste or a copper ink. The copper particle may have a spherical shape, plate shape, dendritic shape, rod shape, or fibrous shape, and may have a hollow shape or an indefinite shape such as a porous shape. The copper particle may have a core-shell structure having a shell containing copper and a core containing a substance other than copper.

In the case of using the copper particles in the conductive composition, the average particle diameter of the copper particles is not particularly limited, and is controlled in such a manner that the conductive composition can be printed by various printing methods such as IJ printing methods and screen printing methods. Specifically, the average particle diameter is preferably 5 nm to 20 μm. In particular, in view of preventing self-aggregation of the particles, preventing oxidation due to surface area increase, or forming a fine wiring of 100 μm or less, the average particle diameter is preferably 10 nm to 10 μm. In view of preparing a conductive composition suitable for continuous printing in the screen printing method, the average particle diameter is preferably 100 nm to 10 μm.

In the present invention, the average particle diameter of the copper particles is obtained by observing the copper particles with a transmission electron microscope or a scanning electron microscope to obtain a microscopic image, by randomly selecting hundred copper particles in the microscopic image, and by measuring the Feret diameters of the selected particles and calculating an arithmetic average of the measured diameters.

The conductive composition may contain one type of the copper particles, or may contain a mixture of the copper particles having different shapes or average particle diameters.

In the surface-coated copper filler of this embodiment of the present invention, the first coating layer is a layer of the amine compound, and the amine compound is chemically and/or physically bonded and adsorbed to the copper on the surface of the copper particle. From the viewpoint of oxidation resistance, it is ideal that the surface of the copper particle is uniformly coated with a monomolecular layer of the amine compound. However, it is practically difficult to form the ideal layer. The copper particle surface may have a portion to which the amine compound is not adsorbed, and may have a portion to which a stack of two or more molecules of the amine compound are adsorbed.

Thus, in the present invention, the first coating layer may be such a layer that the copper surface is uniformly coated with the amine compound, or may be such a layer that the copper surface is partially not coated with the amine compound.

The formation of the first coating layer by adsorbing the amine compound to the copper surface is identified by measuring an IR spectrum of the copper surface as described hereinafter.

The term "the amine compound is chemically bonded and adsorbed to the copper" means that the amine compound and the copper surface are electrostatically interacted to form a bond, whereby the amine compound is adsorbed to the copper surface. The bond formed by the electrostatic interaction may be a hydrogen bond, an ionic bond (formed by an interionic interaction), or the like. The term "the amine compound is physically bonded and adsorbed to the copper" means that the amine compound and the copper surface are physically adsorbed to each other by a van der Waals force. An amino group in the amine compound has a high electron-donating ability, and is believed to be coordinated to the copper to form the bond. Therefore, the first coating layer is considered to be formed in such a manner that the amine compound is adsorbed to the copper surface mainly via the chemical bond formed by the electrostatic interaction. However, the amine compound may be partially adsorbed to the copper surface via the physical bond.

Two or more molecules of the amine compound may be bonded to each other via a hydrogen bond or the like, and may be stacked on a portion of the copper surface.

In the surface-coated copper filler of this embodiment of the present invention, the second coating layer is stacked on the first coating layer, the second coating layer is a layer of the aliphatic monocarboxylic acid having 8 to 20 carbon atoms, and the aliphatic monocarboxylic acid is bonded to the amine compound in the first coating layer via a chemical bond. It is preferred that the first coating layer is uniformly coated with a monomolecular layer of the aliphatic monocarboxylic acid.

The chemical bond is formed by an electrostatic interaction between the carboxyl group of the aliphatic monocarboxylic acid and the amino group of the amine compound. The bond formed by the electrostatic interaction may be a hydrogen bond, an ionic bond (formed by an interionic interaction), or the like. Thus, the second coating layer is a layer of the aliphatic monocarboxylic acid, which is bonded to the amine compound in the first coating layer by the electrostatic interaction. It is ideal that the aliphatic monocarboxylic acid is reacted with the amine compound in the first coating layer to form the second coating layer at the acid/amine ratio of 1/1. However, it is practically difficult to achieve the ideal ratio. The first coating layer may have some molecules of the amine compound to which the aliphatic monocarboxylic acid is not bonded. Two or more molecules of the aliphatic monocarboxylic acid may be stacked by physical adsorption or the like in a portion of the second coating layer.

Thus, in the present invention, the second coating layer may be such a layer that the first coating layer is uniformly coated with the aliphatic monocarboxylic acid, or may be such a layer that the first coating layer is partially not coated with the aliphatic monocarboxylic acid, similarly to the first coating layer.

The formation of the second coating layer by adsorbing the aliphatic monocarboxylic acid is identified by measuring an IR spectrum of the copper surface as described hereinafter in the same manner as the formation of the first coating layer.

In a case where the copper surface has the portion to which the amine compound is not adsorbed, the aliphatic monocarboxylic acid may be adsorbed directly to the portion of the copper surface. The surface-coated copper filler of the present invention includes such a structure.

The amine compound for forming the first coating layer is represented by the above formula (1). Specific examples of such amine compounds include hydrazine, methylenediamine, ethylenediamine, 1,3-propanediamine, dimethylenetriamine, trimethylenetetramine, tetramethylenepentamine, diethylenetriamine, triethylenetetramine, tetraethylenepentamine, dipropylenetriamine, tripropylenetetramine, and tetrapropylenepentamine. The first coating layer may contain one or a plurality of these amine compounds.

When m is 4 or more in the formula (1), the number of the amino groups, responsible for the chemical bond and reducing property, is reduced per unit area of the copper particle surface. Therefore, the oxidation resistance may be insufficiently improved, and the copper surface may be readily oxidized. On the other hand, when n is 3 or more in the formula (1), the amine compound has an excessively long molecular chain, so that adjacent molecules of the amine compound may cause steric hindrance in the coating process, and may fail to coat the copper particle surface. Therefore, the oxidation resistance may be insufficiently improved, and the copper surface may be readily oxidized.

The aliphatic monocarboxylic acid having 8 to 20 carbon atoms used for forming the second coating layer in the present invention may be a linear, saturated, aliphatic monocarboxylic acid having 8 to 20 carbon atoms, a linear, unsaturated, aliphatic monocarboxylic acid having S to 20 carbon atoms, a branched, saturated, aliphatic monocarboxylic acid having 8 to 20 carbon atoms, or a branched, unsaturated, aliphatic monocarboxylic acid having 8 to 20 carbon atoms. Specific examples of the linear, saturated, aliphatic monocarboxylic acids having 8 to 20 carbon atoms include caprylic acid, pelargonic acid, capric acid, undecylic acid, lauric acid, tridecanoic acid, myristic acid, pentadecanoic acid, palmitic acid, margaric acid, stearic acid, nonadecanoic acid, and arachidic acid. Specific examples of the linear, unsaturated, aliphatic monocarboxylic acids having 8 to 20 carbon atoms include myristoleic acid, palmitoleic acid, petroselinic acid, and oleic acid. Specific examples of the branched, saturated, aliphatic monocarboxylic acids having 8 to 20 carbon atoms include 2-ethylhexanoic acid. Specific examples of the branched, unsaturated, aliphatic monocarboxylic acids having 8 to 20 carbon atoms include 3-methylhexenoic acid. The second coating layer may contain one or a plurality of these aliphatic monocarboxylic acids.

When the carbon number of the aliphatic monocarboxylic acid is 7 or less, the aliphatic monocarboxylic acid has a shorter alkyl chain length, so that the dispersibility of the surface-coated copper filler may be lowered. When the carbon number is 21 or more, the aliphatic monocarboxylic acid has a higher hydrophobicity, and exhibits a higher compatibility with a binder in the conductive composition, whereby the aliphatic monocarboxylic acid is readily released from the second coating layer and eluted toward the binder in the conductive composition.

In view of increasing the dispersibility of the surface-coated copper filler and reducing the amount of free molecules of the aliphatic monocarboxylic acid in the conductive composition, the carbon number of the aliphatic monocarboxylic acid is preferably 10 to 18. It is more preferred that the linear, saturated, aliphatic monocarboxylic acid having 10 to 18 carbon atoms is used in the second coating layer, because it can have a closest packing structure to form the second coating layer with a smaller number of gaps as compared with the branched or unsaturated aliphatic monocarboxylic acids.

The surface-coated copper filler of the present invention is characterized in that the two coating layers (i.e. the first coating layer containing the amine compound of the formula (1) and the second coating layer containing the aliphatic monocarboxylic acid having 8 to 20 carbon atoms) are formed on the copper particle surface.

The amine compound has amino groups having a reducing property, and thus has an effect of removing an oxide on the metal surface and an effect of preventing oxidation.

Furthermore, as compared with the aliphatic monocarboxylic acid, the amine compound can be coordinated to the metal more readily due to the lone pairs of the nitrogen atoms in the amino groups. Therefore, as compared with the aliphatic monocarboxylic acid, the amine compound can be bonded to the copper surface more strongly. It is considered that the copper particle surface is coated more readily with the amine compound than with the aliphatic monocarboxylic acid for this reason. In addition, the amine compound can form the bond with the aliphatic monocarboxylic acid due to the electrostatic interaction. Therefore, as compared with a case where the copper particle is coated directly with the aliphatic monocarboxylic acid, in a case where the copper particle surface is coated with the amine compound at a high surface coverage and is further coated with the aliphatic monocarboxylic acid, the coating of the aliphatic monocarboxylic acid can be formed at a higher surface coverage. Consequently, the surface-coated copper filler of the present invention, which has the oxidation preventing effect of the amine compound and the higher surface coverage of the aliphatic monocarboxylic acid, can exhibit a higher oxidation resistance than those of copper fillers having only the aliphatic monocarboxylic acid coating.

The carboxyl group of the aliphatic monocarboxylic acid is considered to be electrostatically interacted and bonded to the amino group of the amine compound as described above. Thus, the aliphatic monocarboxylic acid is considered to be applied to form the second coating layer in such a manner that the hydrophilic carboxyl group is oriented toward the amine compound in the first coating layer, and the hydrophobic alkyl group is oriented outward. As a result, the surface-coated copper filler of the present invention, which has the second coating layer containing the aliphatic monocarboxylic acid, is capable of preventing aggregation of the copper filler and elimination of the amine compound more effectively than copper fillers having only the amine compound coating.

The formation of the amine compound coating and the aliphatic monocarboxylic acid coating on the surface-coated copper filler of the present invention can be identified by measuring an infrared absorption spectrum (IR spectrum) of surface-coated copper filler.

For illustrative purpose, an IR spectrum of a surface-coated copper filler having an ethylenediamine coating and a myristic acid coating (according to Example 1-1 to be hereinafter described) is shown in FIG. 1.

Figure 2:
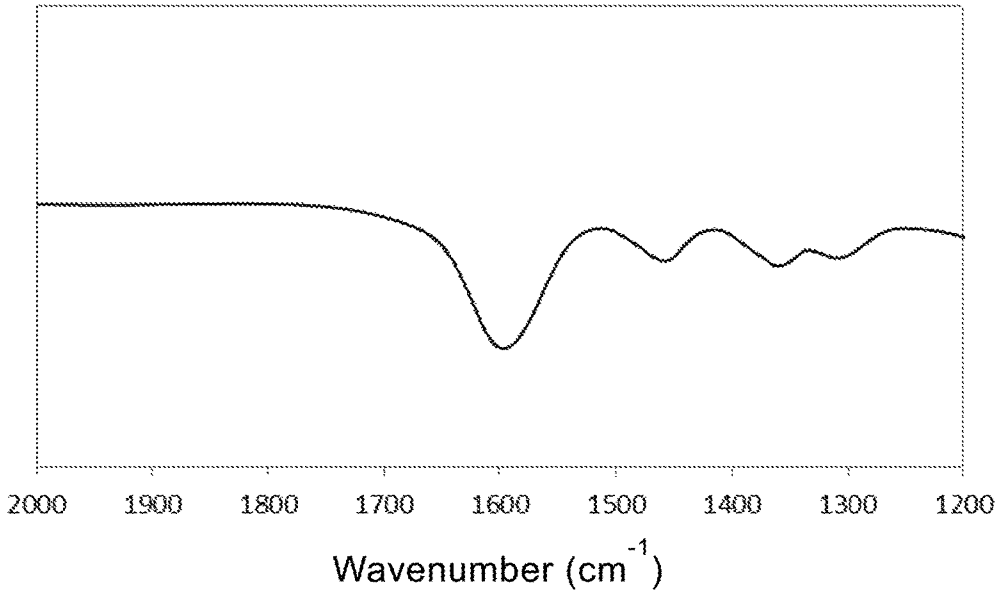
FIG. 2 is a diagram showing an IR spectrum of ethylenediamine.

When only the amine compound used for forming the coating is subjected to the IR measurement, a bending vibration peak of N—H is observed at 1598 cm (see FIG. 2). In contrast, in the IR spectrum of the surface-coated copper filler, the bending vibration peak of N—H is observed at 1576 $cm^{-1}$, and thus shifted toward the low wavenumber region. This indicates that the amine compound is coordinated to the copper particle surface. In addition, in FIG. 1, the C═O stretching vibration peak of the aliphatic monocarboxylic acid is not observed at 1700 $cm^{-1}$, and the peak of the carboxylic acid anion ($—COO^-$) is observed at 1413 $cm^{-1}$. This indicates that the carboxylic acid is electrostatically interacted and bonded to the amine compound.

<Method for Producing Surface-Coated Copper Filler>

Next, a method for producing the surface-coated copper filler of the present invention will be described below.

The surface-coated copper filler of the present invention can be produced by the following method containing steps (A) to (E). It is preferred that a pretreatment step described below is carried out before the step (A). During the production of the copper particle, an impurity such as a copper salt, a dispersing agent, or a copper oxide may be attached to the surface of the copper particle in some cases. Therefore, it is preferred that the impurity is removed before the step (A). By conducting the removal, the dispersibility of the copper particle in a highly polar solvent such as water can be improved, and the surface coverages of the amine compound and the aliphatic monocarboxylic acid on the copper particle surface can be improved.

Pretreatment Step

The pretreatment step is preferably carried out before the production method of the present invention. The pretreatment step is not particularly limited as long as the impurity can be removed from the copper particle surface. For example, washing with an organic solvent or an acid is performed in the pretreatment step.

The type of the organic solvent is not particularly limited. It is preferred that the organic solvent has an excellent wettability on the copper particle surface and that the organic solvent can be easily removed after the washing. One organic solvent or a mixture of a plurality of organic solvents may be used in the pretreatment step. Specific examples of the organic solvents include alcohols, ketones, hydrocarbons, ethers, nitriles, isobutyronitriles, water, and 1-methyl-2-pyrrolidone.

The acid may be an organic or inorganic acid. Examples of the organic acids include acetic acid, glycine, alanine, citric acid, malic acid, maleic acid, and malonic acid. Examples of the inorganic acids include hydrochloric acid, nitric acid, sulfuric acid, hydrogen bromide, and phosphoric acid. The concentration of the acid is preferably 0.1% to 50% by mass, more preferably 0.1% to 10% by mass, in view of reducing reaction heat. When the concentration is less than 0.1% by mass, the impurity may be insufficiently removed. When the concentration is more than 50% by mass, the cost for removing the impurity is increased. The effect of the acid is not improved by increasing the concentration to more than 50% by mass.

It is preferred that after the washing with the acid, the copper particle is further washed with water or the organic solvent to remove the acid remaining on the copper particle surface.

Step (A)

In the production method of the present invention, in the step (A), the copper particle surface is coated with the amine compound of the formula (1).

$$H_2N-[-(CH_2)_m-NH-]_n-(CH_2)_m-NH_2 \qquad (1)$$

In the formula (1), m is an integer of 0 to 3, and n is an integer of 0 to 2. When n is 0, m is an integer of 0 to 3. When n is 1 or 2, m is an integer of 1 to 3.

Specifically, the copper particle, which is subjected to the pretreatment beforehand if necessary, is added to and mixed with an amine compound solution containing the amine compound to prepare a mixture a. The mixture a is stirred to form the first coating layer containing the amine compound on the copper particle surface. The stirring method is not particularly limited as long as the amine compound is sufficiently brought into contact with the copper particle. The mixture a may be stirred by a common stirring method using a known stirring device such as a paddle stirrer or a line mixer.

It is ideal that the copper particle surface is uniformly coated with the first coating layer of a monomolecular layer of the amine compound. Therefore, in the step (A), it is preferred that the ratio between the copper particle and the amine compound is suitable for forming the ideal first coating layer. Specifically, the amount of the amine compound is preferably 0.1 to 200 parts by mass per 100 parts by mass of the copper particle, although the ratio is controlled depending on the diameter or the like of the copper particle. The amount of the amine compound is more preferably 1 to 100 parts by mass in view of preventing free molecules of the amine compound from remaining in the surface-coated copper filler. When the copper particle has a smaller particle diameter, the copper particle has a larger surface area per unit mass, and therefore it is preferred that a larger amount of the amine compound is used.

The solvent of the amine compound solution is not particularly limited as long as the amine compound can be dissolved therein, and the solvent has a satisfactory wettability on the copper particle and does not react with the amine compound and the aliphatic monocarboxylic acid. The solvent preferably contains one or more of alcohols, ketones, ethers, nitriles, sulfoxides, pyrrolidones, and water. Specific examples of the alcohols include methanol, ethanol, 1-propanol, isopropyl alcohol, 1-butanol, 2-butanol, 1-pentanol, tert-amyl alcohol, ethylene glycol, butoxyethanol, methoxyethanol, ethoxyethanol, propylene glycol, propylene glycol monomethyl ether, propylene glycol monopropyl ether, propylene glycol monobutyl ether, and dipropylene glycol monomethyl ether. Specific examples of the ketones include acetone, methyl ethyl ketone, and methyl isobutyl ketone. Specific examples of the ethers include diethyl ether and dibutyl ether. Specific examples of the nitriles include acetonitrile, propionitrile, butyronitrile, and isobutyronitrile. Specific examples of the sulfoxides include dimethyl sulfoxide. Specific examples of the pyrrolidones include 1-methyl-2-pyrrolidone.

The treatment temperature (i.e. the mixing temperature) for forming the first coating layer is equal to or higher than a temperature at which the copper particle can be coated with the amine compound and the solution is not solidified. The temperature is preferably such that the copper is prevented from being oxidized. Specifically, the treatment is preferably carried out at a temperature of −10° C. to 120° C. It is more preferred that the treatment is carried out at a temperature of 30° C. to 100° C. from the viewpoint of increasing the rate of the coating process and preventing the oxidation more effectively.

The treatment time (i.e. the mixing time) is not particularly limited, and is preferably 5 minutes to 10 hours. The time is more preferably 5 minutes to 3 hours in view of lowering the production cost. When the time is shorter than 5 minutes, the copper particle may be insufficiently coated with the amine compound. When the time is longer than 10 hours, the amine compound may be interacted with carbon dioxide in the air to form a salt, and the salt may remain in the surface-coated copper filler as an impurity.

The step (A) is preferably carried out in an inert gas atmosphere. In this case, the salt formation from the amine compound and the carbon dioxide in the air can be prevented, and the oxidation of the copper can be prevented. For example, the mixture a is preferably bubbled with the inert gas. Specific examples of such inert gases include nitrogen, argon, and helium gases. The stirring of the mixture a may be achieved by the bubbling. Thus, the stirring may be omitted in a case where the amine compound can be sufficiently brought into contact with the copper particle only by the bubbling with the inert gas.

Step (B)

In the step (B), the residual amine compound solution containing the remaining free molecules of the amine compound, which are not used in the formation of the first coating layer, is removed from the mixture a, whereby an intermediate 1 containing the copper particle having the first coating layer is obtained. Thus, the step (B) is for removing the excess amine compound solution. In the step (B), it is not necessary to completely remove the excess molecules of the amine compound. The intermediate 1 may be obtained by spontaneous precipitation, centrifugation, or filtration. Thus, even when the intermediate 1 contains a small amount of the free molecules of the amine compound and the solvent, the intermediate 1 may be used in the next step (C) without further purification. It is preferred from the viewpoint of ease of operation that the copper particle having the first coating layer is deposited by the spontaneous precipitation, and the supernatant residual amine compound solution is removed by decantation or an aspirator.

After the removal, the deposited or filtered resultant may be washed with a solvent, in which both of the amine compound and the aliphatic monocarboxylic acid having 8 to 20 carbon atoms can be dissolved, to prepare the intermediate 1. This washing process is preferred because it is capable of reducing the amount of the free molecules of the amine compound remaining in the intermediate 1. Incidentally, in a case where the resultant is washed with water or the like to completely remove the free molecules of the amine compound, also the amine compound molecules in the first coating layer may be removed from the copper surface.

The intermediate 1 may be dried to reduce the amount of the remaining solvent (the solvent of the excess amine compound solution). However, the copper surface may be oxidized during the drying. Therefore, it is preferred that the drying (particularly heat drying) is not carried out.

In a case where the intermediate 1 contains a large amount of the free molecules of the amine compound, the free molecules may be reacted with the carbon dioxide in the air or the aliphatic monocarboxylic acid to produce a salt, and the salt may adversely affect the conductivity of the conductive composition as an impurity disadvantageously.

Therefore, the amount of the amine compound in the intermediate 1 is preferably such that the total amount of the amine compound molecules in the first coating layer and the free amine compound molecules is 10% by mass or less based on the amount of the copper particle. The total amount is more preferably 1.0% by mass or less in view of not affecting the formation of the second coating layer of the aliphatic monocarboxylic acid. The amount of the amine compound in the intermediate 1 can be obtained from the difference between the amine compound amount of the supernatant liquid or the like and the amine compound amount used in the step (A).

Step (C)

In the step (C), the intermediate 1 is mixed with an aliphatic monocarboxylic acid solution containing the aliphatic monocarboxylic acid having 8 to 20 carbon atoms to prepare a mixture b, whereby the second coating layer containing the aliphatic monocarboxylic acid is formed on the first coating layer.

Specifically, the aliphatic monocarboxylic acid solution containing the aliphatic monocarboxylic acid having 8 to 20 carbon atoms is added to and mixed with the intermediate 1 to prepare the mixture b, and the mixture b is stirred to form the second coating layer containing the aliphatic monocarboxylic acid on the first coating layer. The intermediate 1 may be added to and mixed with the aliphatic monocarboxylic acid solution containing the aliphatic monocarboxylic acid having 8 to 20 carbon atoms to prepare the mixture b. The stirring method is not particularly limited as long as the aliphatic monocarboxylic acid is sufficiently brought into contact with the copper particle having the first coating layer. The mixture b may be stirred by a common stirring method using a known stirring device such as a paddle stirrer or a line mixer.

It is ideal that the first coating layer is uniformly coated with the second coating layer of a monomolecular layer of the aliphatic monocarboxylic acid via the bond between the amine compound in the first coating layer and the aliphatic monocarboxylic acid. Therefore, in the step (C), it is preferred that the ratio between the copper particle and the aliphatic monocarboxylic acid is suitable for forming the ideal second coating layer. Specifically, the amount of the aliphatic monocarboxylic acid is preferably 0.1 to 50 parts by mass per 100 parts by mass of the copper particle, although the ratio is controlled depending on the diameter or the like of the copper particle. The amount of the aliphatic monocarboxylic acid is more preferably 0.5 to 10 parts by mass in view of preventing free molecules of the aliphatic monocarboxylic acid from remaining in the surface-coated copper filler. When the copper particle has a smaller particle diameter, the copper particle has a larger surface area per unit mass, and therefore it is preferred that a larger amount of the aliphatic monocarboxylic acid is used.

The solvent of the aliphatic monocarboxylic acid solution is not particularly limited as long as the aliphatic monocarboxylic acid can be dissolved therein, and the solvent has a satisfactory wettability on the copper particle and the first coating layer and does not react with the amine compound and the aliphatic monocarboxylic acid. It is preferred that the solvent can be readily dried and removed in the drying of the step (E).

The solvent preferably contains one or more of alcohols, ketones, ethers, nitriles, sulfoxides, and pyrrolidones. Specific examples of the alcohols include methanol, ethanol, 1-propanol, 2-propanol, 1 butanol, 2-butanol, 1-pentanol, tert-amyl alcohol, ethylene glycol, butoxyethanol, methoxyethanol, ethoxyethanol, propylene glycol, propylene glycol monomethyl ether, propylene glycol monopropyl ether, propylene glycol monobutyl ether, and dipropylene glycol monomethyl ether. Specific examples of the ketones include acetone, methyl ethyl ketone, and methyl isobutyl ketone. Specific examples of the ethers include diethyl ether and dibutyl ether. Specific examples of the nitriles include acetonitrile, propionitrile, butyronitrile, and isobutyronitrile. Specific examples of the sulfoxides include dimethyl sulfoxide. Specific examples of the pyrrolidones include 1-methyl-2-pyrrolidone.

The treatment temperature (i.e. the mixing temperature) for forming the second coating layer is equal to or higher than a temperature at which the copper particle can be coated with the aliphatic monocarboxylic acid and the solution is not solidified. Specifically, the treatment is preferably carried out at a temperature of −10° C. to 80° C. It is more preferred that the treatment is carried out at a temperature of 10° C. to 60° C. from the viewpoint of increasing the rate of the coating process and preventing elimination of the aliphatic monocarboxylic acid in the second coating layer.

The treatment time (i.e. the mixing time) is not particularly limited, and is preferably 5 minutes to 10 hours. The time is more preferably 5 minutes to 3 hours in view of lowering the production cost. When the time is shorter than 5 minutes, the copper particle may be insufficiently coated with the aliphatic monocarboxylic acid. When the time is longer than 10 hours, a released component of a copper-amine-fatty acid complex may remain in the surface-coated copper filler, and the component may adversely affect the conductivity of the conductive composition.

The step (C) is preferably carried out in an inert gas atmosphere. In this case, the salt formation from the amine compound (the amine compound molecules in the first coating layer or the remaining free molecules of the amine compound) and the carbon dioxide in the air can be prevented, and the oxidation of the copper can be prevented. For example, the mixture b is preferably bubbled with the inert gas. Specific examples of such inert gases include nitrogen, argon, and helium gases. The stirring of the mixture b may be achieved by the bubbling. Thus, the stirring may be omitted in a case where the aliphatic monocarboxylic acid can be sufficiently brought into contact with the intermediate 1 only by the bubbling with the inert gas.

Step (D)

In the step (D), the residual aliphatic monocarboxylic acid solution containing the remaining free molecules of the aliphatic monocarboxylic acid, which are not used in the formation of the second coating layer, is removed from the mixture b, whereby an intermediate 2 containing the copper particle having the first and second coating layers is obtained. Specifically, the intermediate 2 may be obtained by filtration. The filtration may be carried out using a known method such as natural filtration, filtration under reduced pressure, or press filtration. It is preferred, from the viewpoint of maximally removing the free molecules of the amine compound and the aliphatic monocarboxylic acid, that the filtered resultant is washed with a solvent, in which both of the amine compound and the aliphatic monocarboxylic acid having 8 to 20 carbon atoms can be dissolved, to prepare the intermediate 2. The adhesion of the conductive composition can be improved by conducting the washing to reduce the amount of the free molecules of the aliphatic monocarboxylic acid.

Step (E)

In the step (E), the intermediate 2 is dried to obtain the surface-coated copper filler of the present invention.

The drying method is not particularly limited. For example, the intermediate 2 may be dried under reduced pressure or freeze-dried. In view of lowering the production cost, the intermediate 2 is preferably dried under reduced pressure. The drying is preferably carried out at a temperature of 20° C. to 120° C. When the drying temperature is lower than 20° C., a longer drying time is required. When the drying temperature is higher than 120° C., the copper may be oxidized. The reduced pressure, the drying temperature, and the drying time may be appropriately selected depending on the combination of various conditions and the type of the solvent. The drying is preferably such that the solvent content of the surface-coated copper filler can be 1% by mass or less.

The particulate surface-coated copper filler can be produced by the above production method.

<Conductive Composition>

The conductive composition containing the surface-coated copper filler of the present invention will be described below.

The conductive composition contains a binder and/or a solvent in addition to the surface-coated copper filler of the present invention.

Specifically, the conductive composition may be a paste prepared by dispersing the surface-coated copper filler in the binder or a nanoparticle ink prepared by dispersing the surface-coated copper filler in the solvent.

In a case where the conductive composition is in the form of the nanoparticle ink, the copper particle for producing the surface-coated copper filler preferably has a particle diameter of 5 to 100 nm.

The binder may be selected from known binders for metal pastes and the like. The binder may be a thereto- or photo-setting resin that can be hardened by applying heat or light. Alternatively, the binder may be a thermoplastic resin.

Specific examples of the thermosetting resins include epoxy resins, melamine resins, phenol resins, silicon resins, oxazine resins, urea resins, polyurethane resins, unsaturated polyester resins, vinyl ester resins, xylene resins, acrylic resins, oxetane resins, diallyl phthalate resins, oligoester acrylate resins, bismaleimide triazine resins, and furan resins. Specific examples of the photosetting resins include silicon resins, acrylic resins, imide resins, and urethane resins.

Specific examples of the thermoplastic resins include polyvinyl chlorides, polyethylenes, polypropylenes, polystyrenes, acrylonitrile-butadiene-styrene copolymer resins, acrylonitrile-styrene copolymer resins, polymethyl methacrylates, polyvinyl alcohols, polyvinylidene chlorides, polyethylene terephthalates, polyamides, polyacetals, polycarbonates, polyphenylene ethers, polybutylene terephthalates, polyvinylidene fluorides, polysulfone resins, polyether sulfone resins, polyphenylene sulfide resins, polyarylates, polyamideimides, polyetherimides, polyetheretherketones, polyamides, polyimides, liquid crystalline polymers, and polytetrafluoroethylenes.

The conductive composition may contain one of these binders or a mixture of two or more of these binders.

In the paste of the conductive composition, the content of the binder is preferably 5 to 100 parts by mass per 100 parts by mass of the surface-coated copper filler. In a case where the conductive composition is used for forming a micro wiring, the hardened product of the conductive composition needs to have a lower volume resistivity. In order to lower the volume resistivity, it is necessary to increase the content of the surface-coated copper filler in the conductive composition, and thereby to bring the copper filler particles closer to each other. Therefore, the content of the binder is more preferably 5 to 50 parts by mass.

The paste-type conductive composition of the present invention may contain a solvent, and may contain a known additive such as an oxide film remover, an antioxidant, a leveling agent, a viscosity modifier, or a dispersant, if required.

The solvent for the nanoparticle ink is not particularly limited as long as it has a satisfactory wettability on the surface-coated copper filler. The solvent may be an alcohol, an ether, a ketone, a nitrile, an aromatic solvent, water, etc. Examples of the alcohols include methanol, ethanol, 1-propanol, 2-propanol, 1-butanol, 2-butanol, tert-butanol, 1-pentanol, 2-pentanol, 3-pentanol, tert-amyl alcohol, 1-hexanol, 1-octanol, 2-ethyl-1-hexanol, ethylene glycol, butoxyethanol, methoxyethanol, ethoxyethanol, ethyl carbitol, ethyl carbitol acetate, butyl carbitol, butyl carbitol acetate, propylene glycol, propylene glycol monomethyl ether, propylene glycol monopropyl ether, propylene glycol monobutyl ether, dipropylene glycol monomethyl ether, and terpineol. Examples of the ethers include acetoxymethoxypropane, phenyl glycidyl ether, and ethylene glycol glycidyl ether. Examples of the ketones include acetone, methyl ethyl ketone, methyl isobutyl ketone, and γ-butyrolactone. Examples of the nitriles include acetonitrile, propionitrile, butyronitrile, and isobutyronitrile. Examples of the aromatic solvents include benzene, toluene, and xylene. The conductive composition may contain one of these solvents or a mixture of two or more of these solvents.

The content of the solvent in the nanoparticle ink-type conductive composition is preferably 10 to 600 parts by mass per 100 parts by mass of the surface-coated copper filler.

The nanoparticle ink-type conductive composition of the present invention may contain a binder, and may contain a known additive such as an oxide film remover, an antioxidant, a leveling agent, a viscosity modifier, or a dispersant, if required.

When a light or heat is applied to the conductive composition containing the surface-coated copper filler of the present invention, the conductive composition is shrunk due to volatilization of the solvent or hardening of the binder, and the copper particles are moved closer to each other by the shrinkage to achieve the desired conductivity.

EXAMPLES

The embodiment of the present invention will be described more specifically below with reference to Examples and Comparative Examples without intention of restricting the scope of the invention.

Measurement and evaluation methods used in Examples and Comparative Examples are described below.

<Infrared Absorption Spectrum (IR Spectrum) Analysis>

Measurement instrument: FT/IR-6100 available from Jasco Corporation

Measurement method: ATR method (under conditions of resolution of 2 $cm^{-1}$ and cumulative number of 80 times)

<Volume Resistivity Evaluation>

Volume resistivity was measured and evaluated according to JIS K 7194.

Measurement instrument: resistivity meter MCP-T610 available from Mitsubishi Chemical Corporation Measurement condition: four-probe method Probe: ASP Sample size: 50 mm×50 mm Thickness: 1 to 30 μm Measurement number: 5 times Pretreatment of Copper Particle Copper particles for Examples and Comparative Examples were washed in the following manner.

220 g of a copper particle (1400YP having a particle diameter of 6.9 μm and a specific surface area of 0.26 $m^2/g$, available from Mitsui Mining & Smelting Co., Ltd.) was added to a mixture liquid of 352 g of toluene and 88 g of isopropanol. The liquid was refluxed at 70° C. for 30 minutes while stirring and dispersing. After the reflux, the toluene and isopropanol were removed from the liquid containing the copper particle by filtration under a reduced pressure. The isolated copper particle was added to 440 g of a 3.5% aqueous hydrochloric acid solution, and the resultant was stirred at 30° C. for 30 minutes. Then, the aqueous hydrochloric acid solution was removed from the liquid containing the copper particle by filtration under a reduced pressure. The isolated copper particle was added to 440 g of isopropanol, and the resultant was stirred at 30° C. for 15 minutes. Then, the isopropanol was removed from the liquid containing the copper particle by filtration under a reduced pressure. The isolated copper particle was dried at 25° C. for 12 hours under a reduced pressure to obtain a pretreated copper particle.

In the filtration under the reduced pressure, a 5C paper filter was used on a Kiriyama funnel, and the reduced pressure was achieved by a diaphragm pump. In the drying under the reduced pressure, the isolated copper particle was placed in a vacuum oven, and the inner pressure of the vacuum oven was reduced by an oil pump.

1. Production of Surface-Coated Copper Filler and Measurement of IR Spectrum

Surface-coated copper fillers of Examples and Comparative Examples were produced in the following manner. In Comparative Example 1-1, the pretreated copper particle having no surface coating layers was used as a filler.

Example 1-1

[Step (A)]

200 g of the pretreated copper particle was added to 600 g of water, and the copper particle-containing water was subjected to nitrogen bubbling at 25° C. for 30 minutes under stirring. The temperature of the copper particle-containing water was increased to 60° C., 400 g of a 50%-by-mass aqueous ethylenediamine solution was added thereto dropwise at a rate of 30 mL/minute, and the resultant was stirred for 40 minutes while maintaining the temperature of 60° C., to prepare a mixture a. The stirring was carried out using a mechanical stirrer at a revolution rate of 150 rpm. Also in the following steps, stirring processes were carried out using the same stirrer at the same revolution rate.

[Step (B)]

After the stirring of the mixture a was stopped, the mixture a was left to stand for 5 minutes, and then about 800 g of the supernatant was removed. To the obtained precipitate was added 800 g of isopropanol for washing, and the resultant liquid was stirred at 30° C. for 3 minutes. After the stirring was stopped, the liquid was left to stand for 5 minutes, and then about 800 g of the supernatant was removed to obtain an intermediate 1.

[Step (C)]

1000 g of an isopropanol solution containing 2% by mass of myristic acid was added to the intermediate 1 to prepare a mixture b. The mixture b was stirred at 30° C. for 30 minutes.

[Step (D)]

After the stirring of the mixture b was stopped, the mixture b was introduced into a Kiriyama funnel having a 5C paper filter. The residual isopropanol solution containing the myristic acid was removed under a reduced pressure by using a diaphragm pump to prepare an intermediate 2.

[Step (E)]

The intermediate 2 was placed in a vacuum oven, and was dried at 25° C. for 3 hours under a reduced pressure using an oil pump to obtain a surface-coated copper filler.

The amine compound, the aliphatic monocarboxylic acid, the amounts thereof, the solvents, and the like used in Example 1-1 are shown in Table 1.

An IR spectrum of a surface of the produced surface-coated copper filler was measured. The result is shown in FIG. 1.

FIG. 1 is a diagram showing the IR spectrum of the surface-coated copper filler of Example 1-1.

When only the ethylenediamine used for forming the coating was measured, an N—H bending vibration peak was observed at 1598 cm (see FIG. 2). In contrast, in the IR spectrum of the produced surface-coated copper filler, the N—H bending vibration peak was observed at 1576 $cm^{-1}$, and thus shifted toward the low wavenumber region. This indicated that the ethylenediamine was coordinated to the copper particle surface. In addition, in FIG. 1, the C═O stretching vibration peak of the myristic acid was not observed at 1700 $cm^{-1}$, and the peak of the carboxylic acid anion ($—COO^-$) was observed at 1413 $cm^{-1}$. This indicated that the myristic acid was electrostatically interacted and bonded to the amine compound.

It was clear from the IR spectrum that both of the ethylenediamine and the myristic acid were attached via chemical bonds to form the first and second coating layers.

Example 1-2

A surface-coated copper filler of Example 1-2 was produced and subjected to IR spectrum measurement in the same manner as Example 1-1 except that hydrazine was used instead of ethylenediamine, the concentration of the hydrazine was 30% by mass, caprylic acid was used instead of myristic acid, the concentration of the caprylic acid was 3% by mass, methanol was used as a washing solvent in the step (B), and methanol was used as a solvent for dissolving the caprylic acid. The amine compound, the aliphatic monocarboxylic acid, the amounts thereof, the solvents, and the like used in Example 1-2 are shown in Table 1.

In the IR spectrum, an N—H bending vibration peak and a carboxylic acid anion peak were observed at 1533 $cm^{-1}$ and 1473 $cm^{-1}$ respectively.

It was clear from the IR spectrum that both of the hydrazine and the caprylic acid were attached via chemical bonds to form the first and second coating layers.

Example 1-3

A surface-coated copper filler of Example 1-3 was produced and subjected to IR spectrum measurement in the same manner as Example 1-1 except that 1,3-propanediamine was used instead of ethylenediamine, the concentration of the 1,3-propanediamine was 20% by mass, arachidic acid was used instead of myristic acid, the concentration of the arachidic acid was 1% by mass, n-propanol was used as a washing solvent in the step (B), and n-propanol was used as a solvent for dissolving the arachidic acid. The amine compound, the aliphatic monocarboxylic acid, the amounts thereof, the solvents, and the like used in Example 1-3 are shown in Table 1.

In the IR spectrum, an N—H bending vibration peak and a carboxylic acid anion peak were observed at 1538 $cm^{-1}$ and 1445 $cm^{-1}$ respectively.

It was clear from the IR spectrum that both of the 1,3-propanediamine and the arachidic acid were attached via chemical bonds to form the first and second coating layers.

Example 1-4

A surface-coated copper filler of Example 1-4 was produced and subjected to IR spectrum measurement in the same manner as Example 1-1 except that diethylenetriamine was used instead of ethylenediamine. The amine compound, the aliphatic monocarboxylic acid, the amounts thereof, the solvents, and the like used in Example 1-4 are shown in Table 1.

In the IR spectrum, an N—H bending vibration peak and a carboxylic acid anion peak were observed at 1560 $cm^{-1}$ and 1451 $cm^{-1}$ respectively.

It was clear from the IR spectrum that both of the diethylenetriamine and the myristic acid were attached via chemical bonds to form the first and second coating layers.

Example 1-5

A surface-coated copper filler of Example 1-5 was produced and subjected to IR spectrum measurement in the same manner as Example 1-1 except that triethylenetetramine was used instead of ethylenediamine. The amine compound, the aliphatic monocarboxylic acid, the amounts thereof, the solvents, and the like used in Example 1-5 are shown in Table 1.

In the IR spectrum, an N—H bending vibration peak and a carboxylic acid anion peak were observed at 1565 $cm^{-1}$ and 1456 $cm^{-1}$ respectively.

It was clear from the IR spectrum that both of the triethylenetetramine and the myristic acid were attached via chemical bonds to form the first and second coating layers.

Example 1-6

A surface-coated copper filler of Example 1-6 was produced and subjected to IR spectrum measurement in the same manner as Example 1-1 except that the concentration of the ethylenediamine was changed from 50% to 10% by mass, lauric acid was used instead of myristic acid, the concentration of the lauric acid was 2% by mass, ethanol was used as a washing solvent in the step (B), ethanol was used as a solvent for dissolving the lauric acid, and the drying temperature was changed from 25° C. to 80° C. in the step (E). The amine compound, the aliphatic monocarboxylic acid, the amounts thereof, the solvents, and the like used in Example 1-6 are shown in Table 1.

In the IR spectrum, an N—H bending vibration peak and a carboxylic acid anion peak were observed at 1560 $cm^{-1}$ and 1451 $cm^{-1}$ respectively.

It was clear from the IR spectrum that both of the ethylenediamine and the lauric acid were attached via chemical bonds to form the first and second coating layers.

Example 1-7

A surface-coated copper filler of Example 1-7 was produced and subjected to IR spectrum measurement in the same manner as Example 1-1 except that a mixture of ethylenediamine and triethylenetetramine (having a mixing ratio of 1:1 by mass) was used instead of ethylenediamine, and a mixture of lauric acid and myristic acid (having a mixing ratio of 1:1 by mass) was used instead of myristic acid. The amine compounds, the aliphatic monocarboxylic acids, the amounts thereof, the solvents, and the like used in Example 1-7 are shown in Table 1.

In the IR spectrum, an N—H bending vibration peak and a carboxylic acid anion peak were observed at 1555 $cm^{-1}$ and 1440 $cm^{-1}$ respectively.

It was clear from the IR spectrum that both of the mixture of the ethylenediamine and the triethylenetetramine and the mixture of the lauric acid and the myristic acid were attached via chemical bonds to form the first and second coating layers.

Comparative Example 1-1

An IR spectrum of a surface of the above-described pretreated copper particle, which had no first and second coating layers, was measured. Of course, no peaks corresponding to the coating layers were observed in the IR spectrum.

The amine compound, the aliphatic monocarboxylic acid, the use thereof, the amounts thereof, the solvents, and the like used in Comparative Example 1-1 are shown in Table 2.

Comparative Example 1-2

A surface-coated copper filler of Comparative Example 1-2 was produced in the same manner as Example 1-1 except that isopropanol was used instead of the isopropanol solution containing 2% by mass of myristic acid in the step (C). Thus, the second coating layer of the myristic acid was not formed in the surface-coated copper filler. The amine compound, the aliphatic monocarboxylic acid, the use thereof, the amounts thereof, the solvents, and the like used in Comparative Example 1-2 are shown in Table 2.

An IR spectrum of a surface of the surface-coated copper filler having only the first coating layer was measured. The result is shown in FIG. 3.

Figure 3:
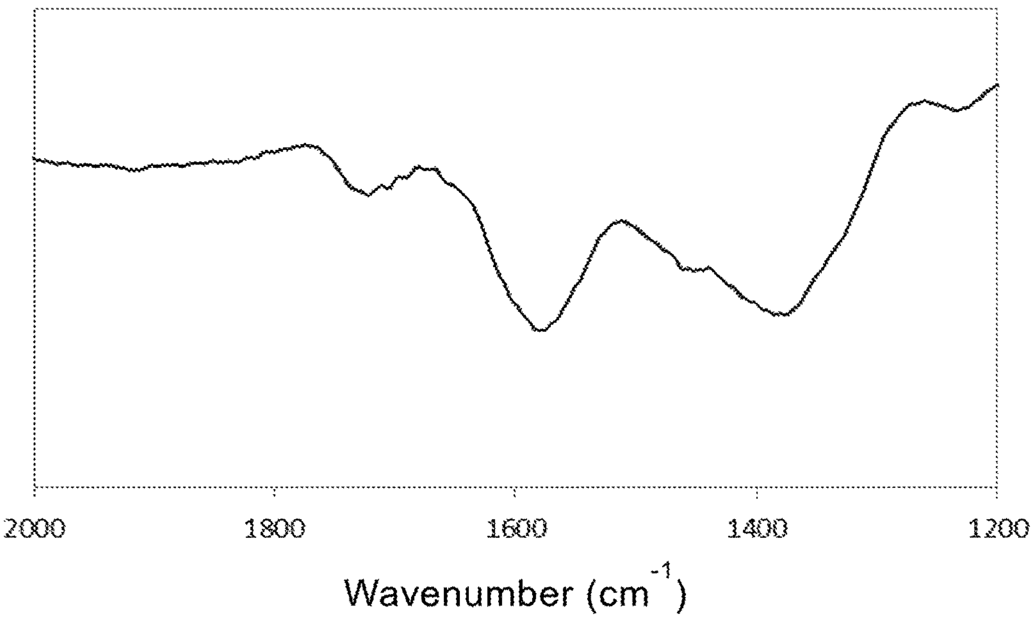
FIG. 3 is a diagram showing an IR spectrum of a surface of a surface-coated copper filler according to Comparative Example 1-2.

In FIG. 3, an N—H bending vibration peak was observed at 1571 $cm^{-1}$. This indicated that the ethylenediamine was coordinated to the copper particle surface. Thus, it was clear from the IR spectrum that the ethylenediamine was attached to the copper particle surface via a chemical bond to form the first coating layer.

Comparative Example 1-3

A surface-coated copper filler of Comparative Example 1-3 was produced in the same manner as Example 1-1 except that water was used instead of the 50%-by-mass aqueous ethylenediamine solution in the step (A). Thus, the first coating layer of the ethylenediamine was not formed, and the myristic acid was applied as the first coating layer in the surface-coated copper filler. The amine compound, the aliphatic monocarboxylic acid, the use thereof, the amounts thereof, the solvents, and the like used in Comparative Example 1-3 are shown in Table 2.

TABLE 1

| | | Examples | | | | | | |
|---|---|---|---|---|---|---|---|---|
| | | 1-1 | 1-2 | 1-3 | 1-4 | 1-5 | 1-6 | 1-7 |
| Amine compound | Type | Ethylene-diamine | Hydrazine | 1,3-Propane-diamine | Diethylene-triamine | Triethylene-tetramine | Ethylene-diamine | Ethylenediamine/ Triethylenetetramine |
| | Solvent | Water | Water | Water | Water | Water | Water | Water |
| | Concentration (% by mass) | 50 | 30 | 20 | 50 | 50 | 10 | 25/25 |
| | Amount (parts by mass)* | 100 | 60 | 40 | 100 | 100 | 20 | 100 |
| Aliphatic mono-carboxylic acid | Type | Myristic acid (C14) | Caprylic acid (C8) | Arachidic acid (C20) | Myristic acid (C14) | Myristic acid (C14) | Lauric acid (C12) | Lauric acid/ Myristic acid |
| | Solvent | Isopropanol | Methanol | n-Propanol | Isopropanol | Isopropanol | Ethanol | Isopropanol |
| | Concentration (% by mass) | 2 | 3 | 1 | 2 | 2 | 2 | 1/1 |
| | Amount (parts by mass)* | 10 | 15 | 5 | 10 | 10 | 10 | 10 |

*Amount based on 100 parts by mass of pretreated copper particle

An IR spectrum of a surface of the surface-coated copper filler having only the first coating layer of the myristic acid was measured. The result is shown in FIG. 4.

Figure 4:
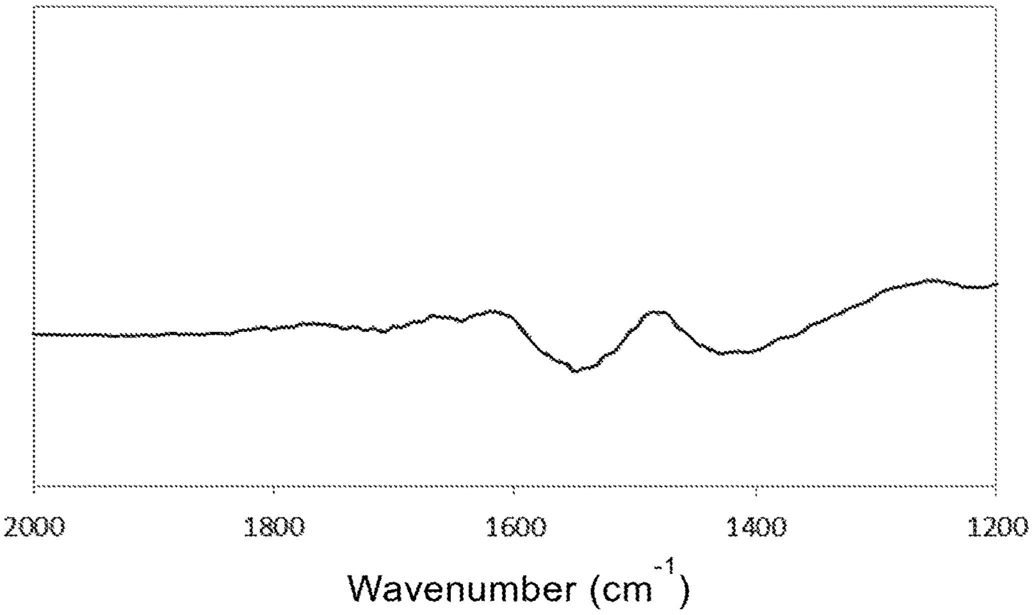
FIG. 4 is a diagram showing an IR spectrum of a surface of a surface-coated copper filler according to Comparative Example 1-3.

In FIG. 4, a carboxylic acid anion peak was observed at 1429 cm 1 This indicated that the myristic acid was electrostatically interacted with and bonded to the copper particle surface. Thus, it was clear from the IR spectrum that the myristic acid was attached to the copper particle surface via a chemical bond to form the coating layer.

Comparative Example 1-4

A surface-coated copper filler of Comparative Example 1-4 was produced and subjected to IR spectrum measurement in the same manner as Example 1-1 except that 1,4-butanediamine was used instead of ethylenediamine. The amine compound, the aliphatic monocarboxylic acid, the use thereof, the amounts thereof, the solvents, and the like used in Comparative Example 1-4 are shown in Table 2.

In the IR spectrum, an N—H bending vibration peak and a carboxylic acid anion peak were observed at 1584 $cm^{-1}$ and 1461 $cm^{-1}$ respectively.

It was clear from the IR spectrum that both of the 1,4-butanediamine and the myristic acid were attached via chemical bonds to form the first and second coating layers.

Comparative Example 1-5

A surface-coated copper filler of Comparative Example 1-5 was produced and subjected to IR spectrum measurement in the same manner as Example 1-1 except that butyric acid was used instead of myristic acid. The amine compound, the aliphatic monocarboxylic acid, the use thereof, the amounts thereof, the solvents, and the like used in Comparative Example 1-5 are shown in Table 2.

In the IR spectrum, an N—H bending vibration peak and a carboxylic acid anion peak were observed at 1555 $cm^{-1}$ and 1442 $cm^{-1}$ respectively.

It was clear from the IR spectrum that both of the ethylenediamine and the butyric acid were attached via chemical bonds to form the first and second coating layers.

Comparative Example 1-6

A surface-coated copper filler of Comparative Example 1-6 was produced and subjected to IR spectrum measurement in the same manner as Example 1-1 except that lignoceric acid was used instead of myristic acid. The amine compound, the aliphatic monocarboxylic acid, the use thereof, the amounts thereof, the solvents, and the like used in Comparative Example 1-6 are shown in Table 2.

In the IR spectrum, an N—H bending vibration peak and a carboxylic acid anion peak were observed at 1538 $cm^{-1}$ and 1453 $cm^{-1}$ respectively.

It was clear from the IR spectrum that both of the ethylenediamine and the lignoceric acid were attached via chemical bonds to form the first and second coating layers.

Comparative Example 1-7

A surface-coated copper filler of Comparative Example 1-7 was produced and subjected to IR spectrum measurement in the same manner as Example 1-1 except that ethylamine was used instead of ethylenediamine and ethanol was used instead of isopropanol. The amine compound, the aliphatic monocarboxylic acid, the use thereof, the amounts thereof, the solvents, and the like used in Comparative Example 1-7 are shown in Table 2.

In the IR spectrum, an N—H bending vibration peak and a carboxylic acid anion peak were observed at 1522 $cm^{-1}$ and 1444 $cm^{-1}$ respectively.

It was clear from the IR spectrum that both of the ethylamine and the myristic acid were attached via chemical bonds to form the first and second coating layers.

Comparative Example 1-8

A surface-coated copper filler of Comparative Example 1-8 was produced in the same manner as Example 1-1 except that hydrazine was used instead of ethylenediamine, and the step (B) was carried out as follows. The amine compound, the aliphatic monocarboxylic acid, the use thereof, the amounts thereof, the solvents, and the like used in Comparative Example 1-8 are shown in Table 2.

[Step (B)]

After the stirring of the mixture a was stopped, the mixture a was left to stand for 5 minutes, and then about 800 g of the supernatant was removed. Then, the precipitate was sufficiently washed with water and heat-dried at 80° C. for 12 hours to obtain an intermediate 1.

An IR spectrum of a surface of the intermediate 1 of Comparative Example 1-8 was measured. The result is shown in FIG. 5.

Figure 5:
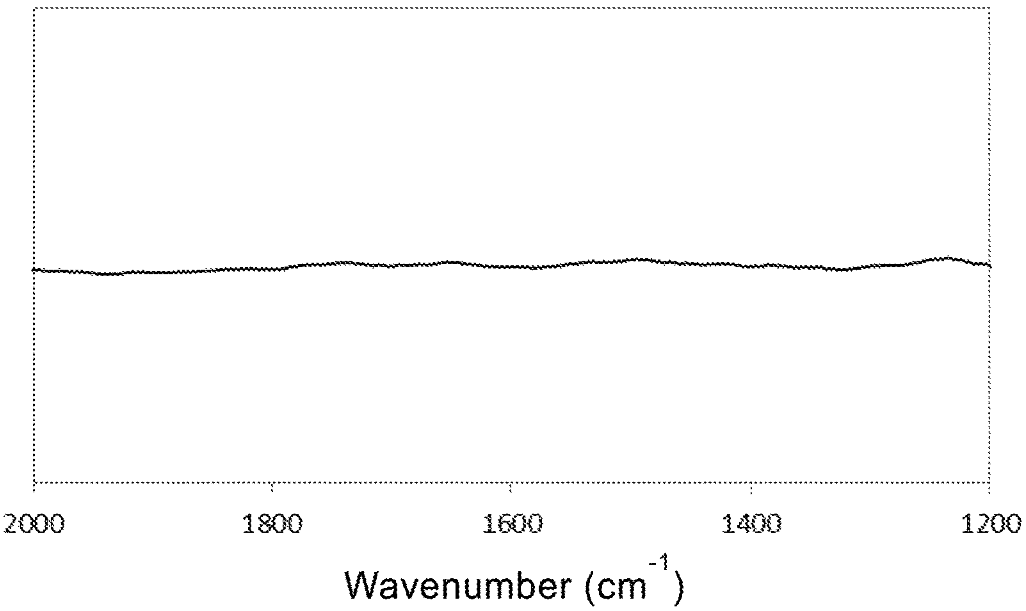
FIG. 5 is a diagram showing an IR spectrum of a surface of a surface-coated copper filler according to Comparative Example 1-8.

In FIG. 5, no N—H bending vibration peak was observed. It was clear that the amine compound was not present on the copper surface. This was because the hydrazine in the first coating layer was eliminated and removed by the water washing.

Furthermore, an IR spectrum of the surface-coated copper filler of Comparative Example 1-8 was measured. In the IR spectrum, a carboxylic acid anion peak was observed at 1430 $cm^{-1}$. It was clear from the IR spectrum that the myristic acid was attached to the copper particle surface via a chemical bond to form the coating layer.

TABLE 2

| | | Comparative Examples | | | | | | | |
|---|---|---|---|---|---|---|---|---|---|
| | | 1-1 | 1-2 | 1-3 | 1-4 | 1-5 | 1-6 | 1-7 | 1-8 |
| Amine compound | Type | — | Ethylene-diamine | — | 1,4-Butane-diamine | Ethylene-diamine | Ethylene-diamine | Ethylamine | Hydrazine |
| | Solvent | — | Water | Water | Water | Water | Water | Water | Water |
| | Concentration (% by mass) | — | 50 | — | 50 | 50 | 50 | 50 | 50 |
| | Amount (parts by mass)* | — | 100 | — | 100 | 100 | 100 | 100 | 100 |
| Aliphatic mono-carboxylic | Type | — | — | Myristic acid (C14) | Myristic acid (C14) | Butyric acid (C4) | Lignoceric acid (C24) | Myristic acid (C14) | Myristic acid (C14) |

TABLE 2-continued

| | | Comparative Examples | | | | | | | |
|---|---|---|---|---|---|---|---|---|---|
| | | 1-1 | 1-2 | 1-3 | 1-4 | 1-5 | 1-6 | 1-7 | 1-8 |
| acid | Solvent | — | Isopropanol | Isopropanol | Isopropanol | Isopropanol | Isopropanol | Ethanol | Isopropanol |
| | Concentration (% by mass) | — | — | 2 | 2 | 2 | 2 | 2 | 2 |
| | Amount (parts by mass)* | — | — | 10 | 10 | 10 | 10 | 10 | 10 |

*Amount based on 100 parts by mass of pretreated copper particle

2. Production of Conductive Composition and Hardened Product Thereof, and Volume Resistivity Measurement Conductive compositions and hardened products thereof, which contained the surface-coated copper fillers of Examples 1-1 to 1-7 and Comparative Examples 1-2 to 1-8 and the uncoated copper filler of Comparative Example 1-1 respectively, were produced in the following manner. The volume resistivities of the hardened products were measured by the above-described method.

A lower volume resistivity corresponds to a more excellent oxidation resistance. In general, it is desirable that a conductor for an electronic device has a volume resistivity of 100 μΩ·cm or less. Therefore, the hardened products having a volume resistivity of 100 μΩ·cm or less were considered acceptable.

Example 2-1

100 g of the surface-coated copper filler of Example 1-1, 27 g of a binder of a resol-type phenol resin PL-5208 available from Gunei Chemical Industry Co., Ltd., and 1.4 g of an oxide film remover of 1,4-phenylenediamine were mixed. The mixture was stirred at the room temperature for 30 seconds at a revolution rate of 1500 rpm by using a planetary mixer ARV-310 available from Thinky Corporation in a primary kneading process.

Then, the mixture was subjected to a secondary kneading process using a triple roll mill EXAKT-M80S available from Nagase Screen Printing Research Co., Ltd. The mixture was passed through the triple roll mill five times at the room temperature, the roll distance being 5 μm.

After the secondary kneading process, to the kneaded mixture was added 2.6 g of a solvent of ethyl carbitol acetate. The resultant mixture was stirred and defoamed under vacuum at the room temperature for 90 seconds by using a planetary mixer at a revolution rate of 1000 rpm, to produce a conductive composition.

The produced conductive composition was applied to an alkali-free glass using a metal mask to form a pattern having a size of width×length×thickness of 1 cm×3 cm×30 μm. The glass having the applied pattern was heated at 150° C. for 15 minutes to produce a hardened product. The volume resistivity of the produced hardened product was measured by the above-described method. The amounts (g) of the components of the conductive composition and the volume resistivity measurement result are shown in Table 3.

Examples 2-2 to 2-7 and Comparative Examples 2-1 to 2-8

Conductive compositions and hardened products of Examples 2-2 to 2-7 and Comparative Examples 2-1 to 2-8 were produced in the same manner as Example 2-1 respectively from the surface-coated copper fillers of Examples 1-2 to 1-7, the surface-coated copper fillers of Comparative Examples 1-2 to 1-8, and the uncoated copper filler of Comparative Example 1-1. The volume resistivities of the hardened products were measured. The amounts (g) of the components of the conductive compositions and the volume resistivity measurement results are shown in Table 3

TABLE 3

| | | | Examples | | | | | | | Comparative Examples | | | | | | | |
|---|---|---|---|---|---|---|---|---|---|---|---|---|---|---|---|---|---|
| | | | 2-1 | 2-2 | 2-3 | 2-4 | 2-5 | 2-6 | 2-7 | 2-1 | 2-2 | 2-3 | 2-4 | 2-5 | 2-6 | 2-7 | 2-8 |
| Conductive composition (g) | Surface-coated copper filler | Ex. 1-1 | 100 | — | — | — | — | — | — | — | — | — | — | — | — | — | — |
| | | Ex. 1-2 | — | 100 | — | — | — | — | — | — | — | — | — | — | — | — | — |
| | | Ex. 1-3 | — | — | 100 | — | — | — | — | — | — | — | — | — | — | — | — |
| | | Ex. 1-4 | — | — | — | 100 | — | — | — | — | — | — | — | — | — | — | — |
| | | Ex. 1-5 | — | — | — | — | 100 | — | — | — | — | — | — | — | — | — | — |
| | | Ex. 1-6 | — | — | — | — | — | 100 | — | — | — | — | — | — | — | — | — |
| | | Ex. 1-7 | — | — | — | — | — | — | 100 | — | — | — | — | — | — | — | — |
| | | Comp. Ex. 1-1 | — | — | — | — | — | — | — | 100 | — | — | — | — | — | — | — |
| | | Comp. Ex. 1-2 | — | — | — | — | — | — | — | — | 100 | — | — | — | — | — | — |
| | | Comp. Ex. 1-3 | — | — | — | — | — | — | — | — | — | 100 | — | — | — | — | — |
| | | Comp. Ex. 1-4 | — | — | — | — | — | — | — | — | — | — | 100 | — | — | — | — |
| | | Comp. Ex. 1-5 | — | — | — | — | — | — | — | — | — | — | — | 100 | — | — | — |
| | | Comp. Ex. 1-6 | — | — | — | — | — | — | — | — | — | — | — | — | 100 | — | — |
| | | Comp. Ex. 1-7 | — | — | — | — | — | — | — | — | — | — | — | — | — | 100 | — |

TABLE 3-continued

| | Examples | | | | | | | Comparative Examples | | | | | | | |
|---|---|---|---|---|---|---|---|---|---|---|---|---|---|---|---|
| | 2-1 | 2-2 | 2-3 | 2-4 | 2-5 | 2-6 | 2-7 | 2-1 | 2-2 | 2-3 | 2-4 | 2-5 | 2-6 | 2-7 | 2-8 |
| Comp. Ex. 1-8 | — | — | — | — | — | — | — | — | — | — | — | — | — | — | 100 |
| PL-5208 (binder) | 27 | 27 | 27 | 27 | 27 | 27 | 27 | 27 | 27 | 27 | 27 | 27 | 27 | 27 | 27 |
| 1,4-Phenylenediamine (oxide film remover) | 1.4 | 1.4 | 1.4 | 1.4 | 1.4 | 1.4 | 1.4 | 1.4 | 1.4 | 1.4 | 1.4 | 1.4 | 1.4 | 1.4 | 1.4 |
| Ethyl carbitol acetate (solvent) | 2.6 | 2.6 | 2.6 | 2.6 | 2.6 | 2.6 | 2.6 | 2.6 | 2.6 | 2.6 | 2.6 | 2.6 | 2.6 | 2.6 | 2.6 |
| Volume resistivity (μΩ · cm) | 39 | 42 | 58 | 51 | 58 | 43 | 48 | >1000 | >1000 | >1000 | 190 | 143 | 112 | 421 | >1000 |

The hardened products of Examples 2-1 to 2-7 had volume resistivities of 100 μΩ·cm or less, and thus were acceptable and excellent in conductivity. Although the conductive compositions of Examples 2-1 to 2-7 were heated at 150° C. in the process for producing the hardened products, the resultant hardened products had such excellent conductivities. Thus, the surface-coated copper fillers of Examples had excellent oxidation resistances. In contrast, the hardened products of Comparative Examples 2-1 to 2-8 had volume resistivities of more than 100 μΩ·cm, and thus were unacceptable and inferior in conductivity to those of Examples. One reason for the results is that the surface-coated copper fillers of Comparative Examples had lower oxidation resistances.

What is claimed is:

1. A surface-coated copper filler for a conductive composition, comprising:

a copper particle;

a first coating layer containing an amine compound, which is bonded to copper on a surface of the copper particle via a chemical bond and/or a physical bond; and a second coating layer containing an aliphatic monocarboxylic acid having 8 to 20 carbon atoms, which is bonded to the amine compound via a chemical bond;

wherein the amine compound is represented by the following formula (1):

$$H_2N\left[\left(CH_2\right)_m NH\right]_n\left(CH_2\right)_m NH_2 \quad (1)$$

wherein m is an integer of 0 to 3, n is an integer of 0 to 2, m is 0 to 3 when n is 0, and m is 1 to 3 when n is 1 or 2.

2. The surface-coated copper filler according to claim 1, wherein the aliphatic monocarboxylic acid is a linear, saturated, aliphatic monocarboxylic acid having 10 to 18 carbon atoms.

3. A conductive composition comprising the surface-coated copper filler according to claim 2.

4. A conductive composition comprising the surface-coated copper filler according to claim 1.

5. A method for producing a surface-coated copper filler for a conductive composition, comprising the steps of:

(A) mixing a copper particle with an amine compound solution containing an amine compound to prepare a mixture a, thereby forming a first coating layer containing the amine compound on a surface of the copper particle;

(B) removing, from the mixture a, the residual amine compound solution containing the remaining free amine compound, not used in the first coating layer, to prepare an intermediate 1 containing the copper particle having the first coating layer;

(C) mixing the intermediate 1 with an aliphatic monocarboxylic acid solution containing an aliphatic monocarboxylic acid having 8 to 20 carbon atoms to prepare a mixture b, thereby forming a second coating layer containing the aliphatic monocarboxylic acid on the first coating layer;

(D) removing, from the mixture b, the residual aliphatic monocarboxylic acid solution containing the remaining free aliphatic monocarboxylic acid, not used in the second coating layer, to prepare an intermediate 2 containing the copper particle having the first and second coating layers; and (E) drying the intermediate 2;

wherein the amine compound is represented by the following formula (1):

$$H_2N\left[\left(CH_2\right)_m NH\right]_n\left(CH_2\right)_m NH_2 \quad (1)$$

wherein m is an integer of 0 to 3, n is an integer of 0 to 2, m is 0 to 3 when n is 0, and m is 1 to 3 when n is 1 or 2.

6. The method according to claim 5, further comprising the step of washing the intermediate 2 with a solvent between the steps (D) and (E), the solvent for washing being the same as a solvent in the aliphatic monocarboxylic acid solution.

* * * * *